United States Patent [19]

Whittaker

[11] Patent Number: 4,644,579

[45] Date of Patent: Feb. 17, 1987

[54] SHUNT REGULATOR FOR HANDS-FREE TELEPHONE

[75] Inventor: Edward J. W. Whittaker, Bishops Stortford, United Kingdom

[73] Assignee: International Standard Electric Corporation, New York, N.Y.

[21] Appl. No.: 746,151

[22] Filed: Jun. 18, 1985

[30] Foreign Application Priority Data

Jun. 28, 1984 [GB] United Kingdom ............... 8416413

[51] Int. Cl.$^4$ .............................................. H04M 1/60
[52] U.S. Cl. ..................................... 379/388; 379/387
[58] Field of Search ............... 179/16 F, 100 L, 81 B, 179/81 R, 16 AA; 381/55, 96

[56] References Cited

U.S. PATENT DOCUMENTS

| | | | |
|---|---|---|---|
| 4,127,743 | 11/1978 | Ozawa et al. | 381/55 |
| 4,495,383 | 1/1985 | Lubin et al. | 179/100 L |
| 4,608,462 | 8/1986 | Blomely et al. | 179/81 B |

Primary Examiner—Gene Z. Rubinson
Assistant Examiner—R. Vaas
Attorney, Agent, or Firm—John T. O'Halloran; Thomas F. Meagher

[57] ABSTRACT

In a loudspeaking telephone the power supply to the loudspeaker amplifier is shunted by a regulator which functions as a programmable Zener diode. Under conditions of low available line current, e.g. where two similar instruments are operated in parallel at the end of a long line, the regulator voltage is reduced in value to disable the amplifier and conserve power to maintain the basic operating functions of the telephone.

4 Claims, 3 Drawing Figures

SHUNT REGULATOR FOR HANDS-FREE TELEPHONE

This invention relates to a shunt regulator circuit for use e.g. with a hands-free loudspeaking telephone instrument.

A hands-free telephone instrument incorporates an audio voltage stage for use when the instrument is used in its hands-free mode. It will be appreciated that such an output stage consumes a relatively high current to achieve the necessary audio power output. This current must of course, where a load battery is not provided, be drawn from the line.

Where such an arrangement is used in a fully electronic telephone, i.e. an instrument in which the various control and operating functions are performed by integrated circuits, the high current drain of the audio output stages can reduce the line voltage presented to the telephone circuitry to an unacceptably low value. In such circumstances the voltage can fall below the value at which reliable operation of the telephone instrument can be sustained. Moreover, the electrical characteristics of such an instrument may not meet the specification of the telephone administration.

The object of the present invention is to minimise or to overcome this disadvantage.

According to the invention there is provided a telephone instrument, including a loudspeaker and an audio amplifier therefor, a line driven power supply for the amplifier, and means for progressively disabling said amplifier when the current available from the line is less than a predetermined value.

According to the invention there is further provided a telephone instrument, including a loudspeaker, an amplifier whereby the loudspeaker, in use, is driven, one or more integrated circuits providing the control and operation of the instrument and for interfacing the instrument to the line, and means responsive to the magnitude of the current available from the line for progressively disabling the amplifier when the available line current falls below a predetermined value.

By progressively disabling the audio amplifier under low line current conditions the current drain of the instrument is reduced and the voltage supply to the remainder of the telephone circuitry is maintained at or above the minimum value required for reliable operation. Thus, although at low line currents the loudspeaker will not operate and the telephone cannot then be used in the hands-free mode, the basic telephone functions are maintained allowing calls to be made and received in the conventional mode.

An embodiment of the invention will now be described with reference to the accompanying drawings in which.

Figure 3:
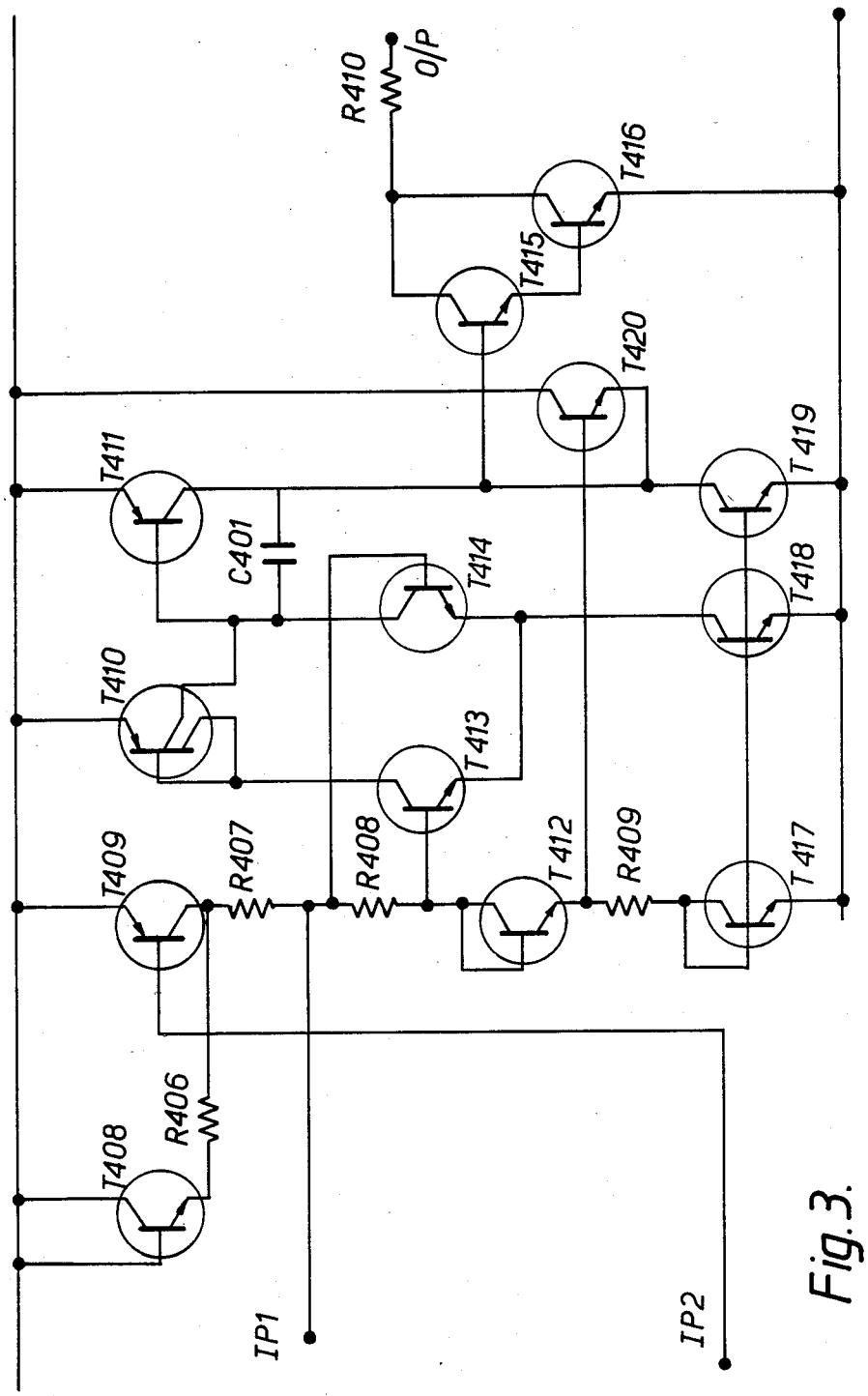

and FIG. 3 shows one form of shunt regulator circuit.

Figure 1:
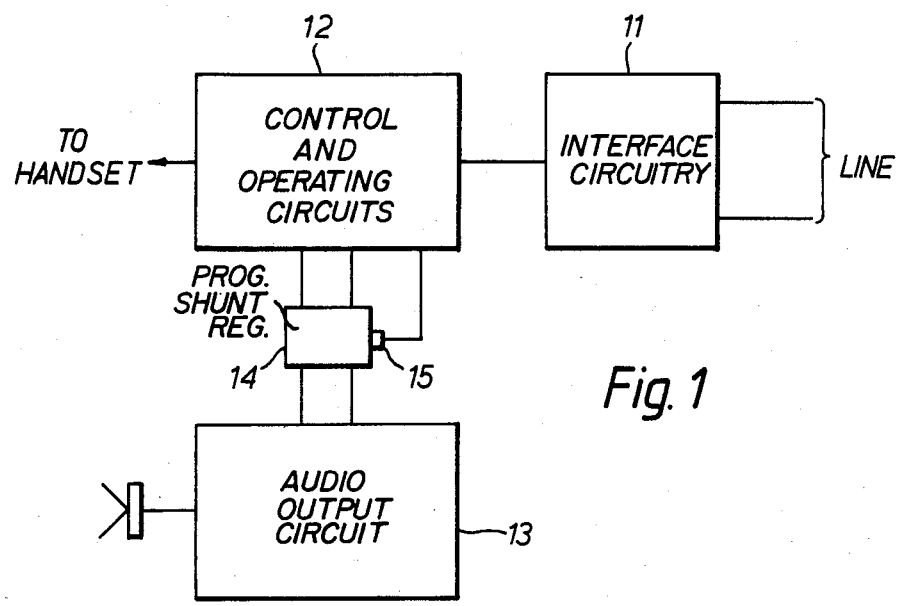
FIG. 1 is a block schematic diagram of a telephone instrument provided with the shunt regulator.

Referring to FIG. 1, the instrument includes interface circuitry 11 whereby the instrument is coupled to the line, control and operating circuits 12, an audio output circuit 13 and a programmable shunt regulator 14. Typically the circuits 11, 12 and 13 will comprise one or more integrated circuits. The regulator 14 is coupled across the supply rails to the audio output circuit 13 and has a control input 15 whereby the output voltage of the regulator is determined. Electrically the regulator functions on a programmable Zener diode. The control signal applied to the input 15 comprises a voltage determined by the direct line current being drawn by the telephone instrument. Under low current conditions, e.g. where two similar instruments are used in parallel in combination with a long subscriber loop, the regulator is turned on to reduce its output voltage. This reduces the amplifier supply voltage and hence reduces the current drawer by the amplifier from the line. The net result is that the supply voltage to the circuits 11 and 12, which draw a relatively small current, is maintained at a sufficiently high value to ensure reliable operation of the instrument.

Figure 2:
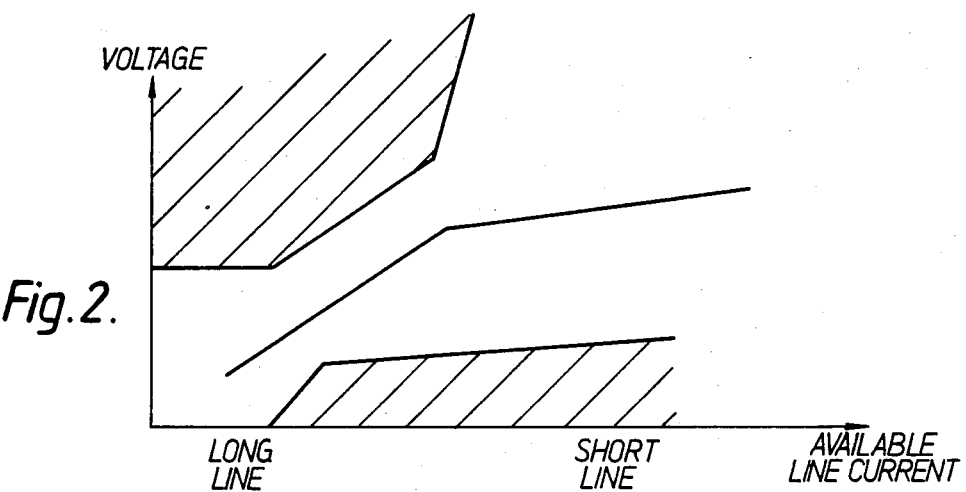
FIG. 2 illustrates the current/voltage characteristic of the instrument of FIG. 1.

FIG. 2 illustrates the operation of the instrument. The shaded regions of FIG. 2 indicate the limits improved by the administration specification. At high line currents the shunt regulator is inoperative and normal operation of the instrument takes place. At low currents below a predetermined value, $I_{min}$ the voltage of the regulator is progressively reduced providing a sloping characteristic. This ensures current sharing when two similar instruments are connected in parallel. In the absence of such a technique current hogging by one instrument may be experienced. More importantly the sloping characteristic introduced by the technique ensures that the telephone administration specification can easily be met. Also the technique takes advantage of the specification on short lines to provide more loudspeaker power than conventional circuits.

Telephone circuitry is associated with the shunt regulator in which the incoming positive line provides power for the transmission circuits and is terminated via the series combination of an impedance and a capacitor. An audio amplifier and shunt regulator are connected in parallel between the negative line and a further line at a potential between the positive and negative line potentials.

The available line current is sensed by an amplifier, which measures the direct voltage drop, a resistor connected in series with the transmitter circuits. The output signal from this amplifier is fed to the control input of the shunt regulator whereby the output voltage of the shunt regulator is determined. The output signal from the amplifier may also be used to control other portions of the instrument circuitry.

FIG. 3 shows by way of example a shunt regulator for use in the circuit of FIG. 1. The reference element of the regulator is the silicon bandgap. The programme input signal from the aforementioned amplifier is fed via IP1 to a long tailed transistor pair of transistors T413 and T414, the collector currents of the pair being supplied by a double collector transistor T410. During normal operation transistor T409 is turned on via input IP2 thus shorting out the series combination of transistor T408 and resistor R406. Transistors T412 and T417 provide negative temperature coefficient compensation for the positive temperature coefficient provided by mismatch of transistors T413 and T414. Typically a load mismatch of this pair of transistors is provided by suitable device processing techniques. Transistor T411 forms an intermediate stage of amplification between the long tailed pair and the Darlington pair output stage comprising transistors T415 and T416. Preferably the current through the output stage is limited by collector load comprising resistor R410. Capacitor C401 and transistors T418, T419, T420 may be included in the circuit to improve loop stability and reduce the response time. Transistor T408 acts on a 'catch' to prevent high voltage transients across the power supply when the instrument goes from 'on hook' to 'off hook'.

Typically the regulator is set to give an output Vout of 2.4 to 2.5 volts with no programme input. The response of the circuit to an input current Iin is given by $$\Delta V\text{out} = I\text{in} \times R407.$$

Whilst the shunt regulator circuit has been described with particular reference to telephone applications it is not of course so limited and may also be employed e.g. in an intercom.

I claim:

1. A shunt regulator circuit for a telephone instrument connected to a telephone line for controlling a current supply to a loudspeaker amplifier in said telephone instrument, the circuit including said amplifier which is responsive to an input signal representative of the magnitude of current on the line, and a voltage regulator coupled in parallel with said current supply, such that, when the line current is less than a predetermined value, the output voltage of said regulator is progressively reduced with diminishing line current so as to disable said amplifier.

2. A shunt regulator as claimed in claim 1, wherein said signal responsive amplifier comprises a long-tailed transistor pair.

3. A shunt regulator as claimed in claim 2, wherein said voltage regulator comprises a Darlington transistor pair.

4. A shunt regulator circuit as claimed in claim 1, wherein said circuit is configured on an integrated circuit chip.

* * * * *